United States Patent
Fertig et al.

(10) Patent No.: US 9,631,978 B2
(45) Date of Patent: Apr. 25, 2017

(54) METHOD FOR A HAIR COLOUR CONSULTATION

(75) Inventors: Werner Fertig, Bensheim (DE); Detlef Mattinger, Bickenbach (DE); Stefan Uhl, Pfungstadt (DE)

(73) Assignee: HFC Prestige International Holding Switzerland S.a.r.l, Geneva (CH)

( * ) Notice: Subject to any disclaimer, the term of this patent is extended or adjusted under 35 U.S.C. 154(b) by 3889 days.

(21) Appl. No.: 10/487,638

(22) PCT Filed: Aug. 30, 2002

(86) PCT No.: PCT/EP02/09685
§ 371 (c)(1),
(2), (4) Date: Jul. 22, 2004

(87) PCT Pub. No.: WO03/020072
PCT Pub. Date: Mar. 13, 2003

(65) Prior Publication Data
US 2004/0239689 A1 Dec. 2, 2004

(30) Foreign Application Priority Data
Aug. 30, 2001 (DE) .................................. 101 42 526

(51) Int. Cl.
*G09B 11/00* (2006.01)
*G01J 3/52* (2006.01)
(Continued)

(52) U.S. Cl.
CPC ............ *G01J 3/526* (2013.01); *A45D 44/005* (2013.01); *G06T 11/60* (2013.01); *A45D 2019/0066* (2013.01); *A45D 2044/007* (2013.01)

(58) Field of Classification Search
USPC ................... 434/84, 94, 98–100; 382/100
See application file for complete search history.

(56) References Cited

U.S. PATENT DOCUMENTS 3,809,785 A * 5/1974 Calabrese et al. ............ 434/100
4,258,478 A * 3/1981 Scott et al. ..................... 434/94
(Continued)

FOREIGN PATENT DOCUMENTS

DE 3213806 A1 10/1983
DE 4224922 A1 2/1994
(Continued)

*Primary Examiner* — Robert J Utama
(74) *Attorney, Agent, or Firm* — Schwegman Lundberg & Woessner, P.A.

(57) ABSTRACT

In the method of hair color consultation, actual individual images of a person are continuously recorded by a video camera and are input into a computer in a continuous sequence in real time. Automatic image editing and processing is carried out in real time, in which the computer continuously marks hair regions of the individual images by an automatic analysis of close and similar pixel color values, of contiguous texture, and/or of contiguous morphological properties, and changes hair color of the hair regions according to predetermined specifications. Then the modified individual images with the changed hair color are displayed on the at least one screen and/or touch screen in real time so that the desired hair color may be selected. An apparatus for performing the method is also described.

3 Claims, 2 Drawing Sheets

(51) Int. Cl.
*A45D 44/00* (2006.01)
*G06T 11/60* (2006.01)
*A45D 19/00* (2006.01)

(56) References Cited

U.S. PATENT DOCUMENTS

| | | | | |
|---|---|---|---|---|
| 4,297,724 A | * | 10/1981 | Masuda et al. | 348/77 |
| 4,731,743 A | | 3/1988 | Blancato | |
| 4,872,056 A | * | 10/1989 | Hicks et al. | 348/584 |
| 5,060,171 A | * | 10/1991 | Steir et al. | 345/630 |
| 5,506,946 A | * | 4/1996 | Bar et al. | 345/600 |
| 5,508,718 A | * | 4/1996 | Haikin | 345/601 |
| 5,562,109 A | * | 10/1996 | Tobiason | 132/200 |
| 5,689,286 A | * | 11/1997 | Wugofski | 715/835 |
| 5,937,081 A | * | 8/1999 | O'Brill et al. | 382/111 |
| 6,034,698 A | | 3/2000 | Yasuda | |
| 6,081,611 A | * | 6/2000 | Linford et al. | 382/128 |
| 6,141,431 A | * | 10/2000 | Munetsugu et al. | 382/100 |
| 6,147,692 A | * | 11/2000 | Shaw et al. | 345/643 |
| 6,226,010 B1 | * | 5/2001 | Long | 345/594 |
| 6,293,284 B1 | * | 9/2001 | Rigg | 132/200 |
| 6,437,866 B1 | * | 8/2002 | Flynn | 356/402 |
| 6,633,289 B1 | * | 10/2003 | Lotens et al. | 345/419 |
| 6,692,436 B1 | * | 2/2004 | Bluth et al. | 600/300 |
| 6,719,565 B1 | * | 4/2004 | Saita et al. | 434/94 |
| 6,792,401 B1 | * | 9/2004 | Nigro et al. | 703/6 |
| 6,813,591 B1 | * | 11/2004 | Ohwi | 703/2 |
| 6,824,387 B2 | * | 11/2004 | Sakai et al. | 434/94 |
| 6,937,755 B2 | * | 8/2005 | Orpaz et al. | 382/162 |
| 7,151,851 B2 | * | 12/2006 | Ladjevardi | 382/162 |
| 7,634,103 B2 | * | 12/2009 | Rubinstenn et al. | 382/100 |
| 2002/0010556 A1 | * | 1/2002 | Marapane et al. | 702/32 |
| 2002/0054714 A1 | * | 5/2002 | Hawkins et al. | 382/276 |
| 2003/0063102 A1 | * | 4/2003 | Rubinstenn et al. | 345/619 |
| 2003/0065255 A1 | * | 4/2003 | Giacchetti et al. | 600/407 |
| 2004/0176977 A1 | * | 9/2004 | Broderick et al. | 705/1 |
| 2005/0244057 A1 | * | 11/2005 | Ikeda et al. | 382/181 |

FOREIGN PATENT DOCUMENTS

| | | | |
|---|---|---|---|
| DE | 196 35 753 A1 | 4/1998 | |
| EP | 0725364 A2 | 8/1996 | |
| EP | 1 147 722 A | 10/2001 | |
| EP | 1147722 A1 | * 10/2001 | ............ A45D 44/00 |
| WO | WO-9703517 A1 | 1/1997 | |
| WO | WO-9923609 A1 | 5/1999 | |
| WO | 01 32051 A | 5/2001 | |

* cited by examiner

US 9,631,978 B2

METHOD FOR A HAIR COLOUR CONSULTATION

CROSS-REFERENCE

This is the US National Stage of PCT/EP 02/09685, filed on Aug. 30, 2002, in Europe. The invention described in the following description is also described and claimed in DE 101 42 526.0, which was filed on Aug. 30, 2001, in Germany. The aforesaid German Patent Application provides the basis for a claim of priority of invention for the invention described herein below under 35 U.S.C. 119 (a) to (d).

BACKGROUND OF THE INVENTION

1. The Field of the Invention

The invention relates to a method for a hair color consultation or hair color simulation, in which by means of a video camera, a computer, and at least one screen, a person selects a desired hair color displayed on the at least one screen.

2. The Description of the Related Art

One such method for a hair color consultation is known for instance from European Patent Disclosure EP 1147722 A1, which uses a static digital portrait that has been taken, and in which a desired hairstyle color is input selectively and shown on a screen (display).

Before deciding on a new hair color, a person, for instance a hair stylist's customer, has to overcome an inhibition threshold, because she does not know in advance how she will look afterward. To support the hairdresser here in his consultation with her, with the hair color consultation computer system of EP 1147722 A1, a two-dimensional picture (digital photograph) of a person is provided with a new, simulated hair color and shown on a screen; the result looks static and unnatural. One reason why the results of conventional hair color consultation computer systems have a static effect is that they are static because they show a still picture. A photograph cannot replace a moving, living image, of the kind the person sees for instance when she looks into the mirror after her treatment.

SUMMARY OF THE INVENTION

The object of the invention is to create a generic method for a hair color consultation that does not have these disadvantages.

According to the invention the foregoing object is attained by a method of hair color consultation or hair color simulation, which comprises the steps of:

a) recording current individual images of the person by means of a video camera and transmitting the recorded individual images into a computer in a continuous image sequence in real time;

b) automatically editing and processing the individual images by means of a device, in which the computer continuously marks hair regions of the individual images by an automatic analysis of close and similar pixel color values and/or of contiguous texture and/or of contiguous morphological properties and changes the hair color of the hair color regions according to predetermined specifications to produce altered individual images; and then c) displaying the altered individual images with the changed hair color on the at least one screen and/or touch screen in real time.

By means of this method for a hair color consultation, it is possible for the result of hair coloring to be visualized before the actual color change is made. In contrast to existing hair color consultation systems, it is based on the one hand on a dynamic video image and on the other on a change in color of the natural hair of the person. The video image is prepared in real time by the method and reproduced on a screen in such a way that the impression is of using a mirror. Other advantageous features of the invention are disclosed in the dependent claims.

The invention selectively simulates looking at an image either as others would see it or as its own mirror image. To that end, with a video camera, the current picture of the person is taken, automatically prepared by a computer, and displayed on a screen. By means of this dynamic display in real time, the screen becomes a mirror. The task of the computer is to modify the initial picture in such a way that the result of hair coloring is simulated. To that end, the computer system must recognize the hair of the person automatically and then change its color in accordance with its specifications, or the specifications of the stylist. In this way, a dynamic simulation with a natural effect is created. Since only the natural hair in motion is changed in color, the effect of "computerized wigs" placed on the head with appropriate coloring is eliminated. The hair falls into place naturally and is not rigid, and the person can move in front of the virtual mirror, turn her head, look at herself from the side, change her facial expression, and with the new hair color decide on her own whether the desired hair color 32 selected meets her expectations. If not, other desired hair colors 32 can immediately be simulated instead.

BRIEF DESCRIPTION OF THE DRAWING

The invention will be described in further detail in terms of an exemplary embodiment.

Shown are.

DETAILED DESCRIPTION OF THE INVENTION

Figure 1:
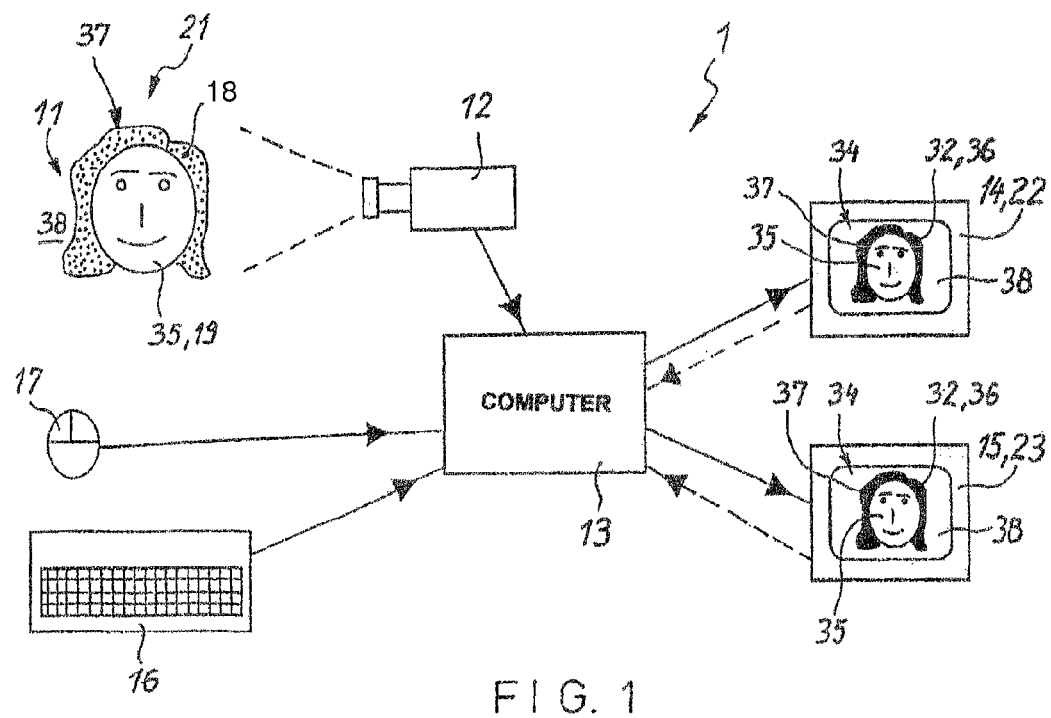
FIG. 1, a schematic sequence of a method for a hair color consultation in the form of a hair color consultation system.

FIG. 1 shows a schematic sequence of a method for a hair color consultation in the form of a hair color consultation system 1, in which by means of a video camera 12, a computer 13, and at least one screen 14 or touch screen 22, a selection and display of a desired hair color 36 of a person 11 is shown on the screen or touch screen 14, 22; current individual pictures 21 of the person 11 are taken continuously by the video camera 12. This continuous picture sequence of individual pictures 21 of the video camera 12 is transmitted to the computer 13 in real time. In the computer, for each individual picture 21, by means of a device 31, an automatic picture preparation and picture processing is performed, in which the computer 13 identifies a hair region 32 of the person 11 by segmentation, which means a recognition and separation of relevant picture regions, and also identifies the natural hair color 33, changes the hair color 33 of this hair region 32 in accordance with predetermined specifications, and displays the altered individual pictures 21, again in real time, on at least one screen 14, 15 or touch screen 22, 23. In this context, real time means a time lag that is imperceptible or only hardly perceptible by the person 11 between the individual pictures 21 taken and their display on the screen 14, 15 or touch screen 22, 23 with a fluid display of the motions. The result, among other effects, is also a minimal picture rate of approximately ten individual pictures 21 per second.

Before an actual simulation with a new desired hair color 36, certain starting parameters are imparted to the computer 13 (initialization). To this end, the device 31 continuously and automatically processes starting parameters of a picture region 34 that are input manually; as at least one starting parameter, a hair region 32 is marked and covered with a selective desired hair color 36. As further combinations of starting parameters, provision can be made to identify which picture regions 34 represent a hair region 32 and which represent skin 35, and what these picture regions are characterized by (color tones, texture, morphology and so forth), what the predominant (natural) initial hair color 33 is, and what color (desired hair color 36) is wanted. This can be done by way of selecting or masking picture regions 34 or selection areas of one or more control menus on the screen 14, 15 or touch screen 22, 23. The input devices needed for this purpose can be provided for instance in the form of a mouse 17 or the like (trackball, touchpad, etc.), as a keyboard 16, and/or as at least one touch screen 22, 23. The initialization phase may be necessary among other reasons in order to tell the computer 13 which picture regions 34 of the hair region 32 represent the hairstyle 37, which is to be separated from the remaining image and changed in color. One way this can be done is for the user, in at least one of the picture regions 34, to mark the hair 18, skin 19, and a background 38 one or more points or one or more regions. Moreover, it is possible for regions to be marked that are explicitly not to be changed in color, such as eyebrows, sideburns, or a beard. To make it easier for the computer 13 to recognize the hair regions 32 and to keep the vulnerability to error of the hair color consultation system 1 slight, it is advantageous to take a picture of a person 11 in front of a homogeneous, single-color background 38, with as well-defined lighting as possible.

The hair region 32 is marked continuously by means of an automatic analysis of close and similar pixel color values and covered accordingly with the desired hair color 36, making it simple to track the hair region 32, which changes continuously as the person 11 moves. To that end, for analyzing close and similar pixel color values, a representative portion of the hair region 32 is selected manually, and the automatic analysis is then started, as a result of which the device 31 for continuous picture preparation only has to prepare the hair region 32 with the desired hair color 36. This automatic marking is based on the thought that the initial hair color 33 in the hair region 32 has a cohesive area of close and similar pixel color values that can be clearly differentiated from the remaining picture region 34.

However, the hair region 32 can be selectively marked continuously by means of an automatic analysis of a cohesive texture and/or cohesive geomorphological properties, in order to clearly differentiate the remaining picture region 34.

Figure 3:
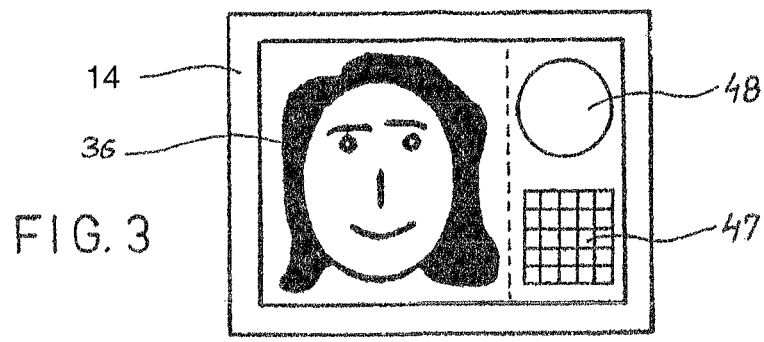
FIG. 3, a screen or touch screen with a color palette or color-wheel spectrum.

Depending on where it is to be used (salon/retail), besides the person 11 an advisor, for instance a hairdresser, can also be present. In that case, it is appropriate for the hairdresser to have his own, second screen 15 or touch screen 23 available, for operating the program and for initialization. On this second screen 15 or touch screen 23, in addition to the camera image, important control information can be shown, such as the color palette 47 (FIG. 3) of the target hair colors (desired color 36), so that all that has to be displayed on the first screen 14 or touch screen 22 for the person 11 is the outcome of the simulation. The touch screen 22, 23 has the advantage that additional input devices are unnecessary, since appropriate control menus or selection areas are activated directly by touching them on the surface of the touch screen with a finger or stylus.

Figure 2:
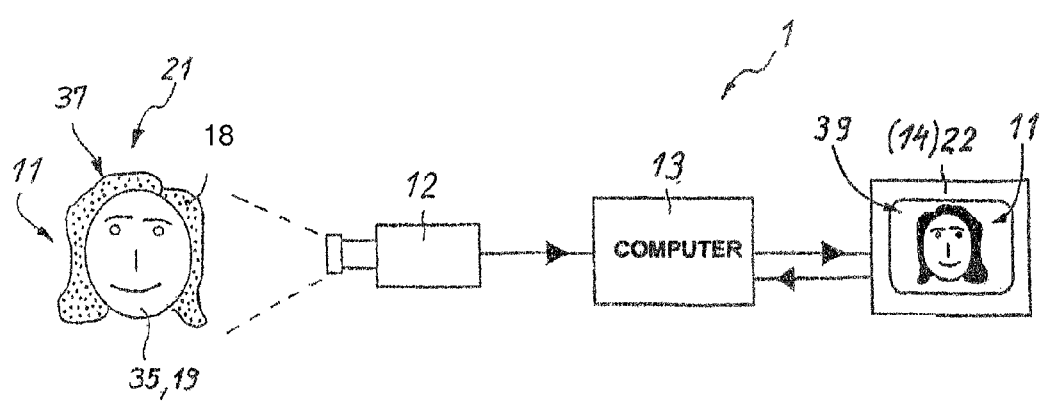
FIG. 2, a schematic sequence of a method for a hair color consultation with a screen showing a mirror image of a person.

In a preferred embodiment, the continuous video images of the person 11 are displayed by the computer 13 constantly in mirror inversion about a vertical axis on the screen 14 in the form of a mirror image 39 (FIG. 2). This creates the impression as if one were looking in a mirror, which fits everyday habits and makes it easy to use the hair color consultation system 1. To minimize parallax between the video camera 12 and the screen 14, 15 or touch screen 22, 23, the video camera 12 should be positioned close to the upper edge of the screen 14, 15, 22, 23, as for instance in German Patent Disclosure DE 19635753 A1, FIG. 4. Ideally, the optical axis of the video image 34 coincides with the optical axis of the screen 14, 15 or touch screen 22, 23, in order to avoid parallax entirely. One suitable way of attaining this is for instance also described in DE 19635753 A1, in FIG. 5. To perfect the effect of a mirror, the scale of imaging of the person 11 and of the screen 14, 15 or touch screen 22, 23 should be in a ratio of about 1:1.

In a special embodiment, it is provided that the hair color 33 is changed continuously and in a cycle in accordance with a color-wheel spectrum 48 (FIG. 3), and starting or stopping of this ongoing color change is also provided. Thus a targeted input of a desired hair color 36 from a color palette 47 becomes unnecessary, since at the moment when a person 11 believes she has found a color tone that suits her, the ongoing color change is simply stopped, and the stopped color tone can also be manually shifted in this area until the actual desired hair color 36 is attained. The cycle of the ongoing color change can be freely selected in its repetition rate, and as a result can be adapted individually to a person 11. This ongoing color change is also especially well suited to a demonstration for advertising purposes of a change in color of a customer 11, for instance in a drugstore; for advertising purposes, a suitable video film can selectively be shown on the screen 14, 15.

Figure 4:
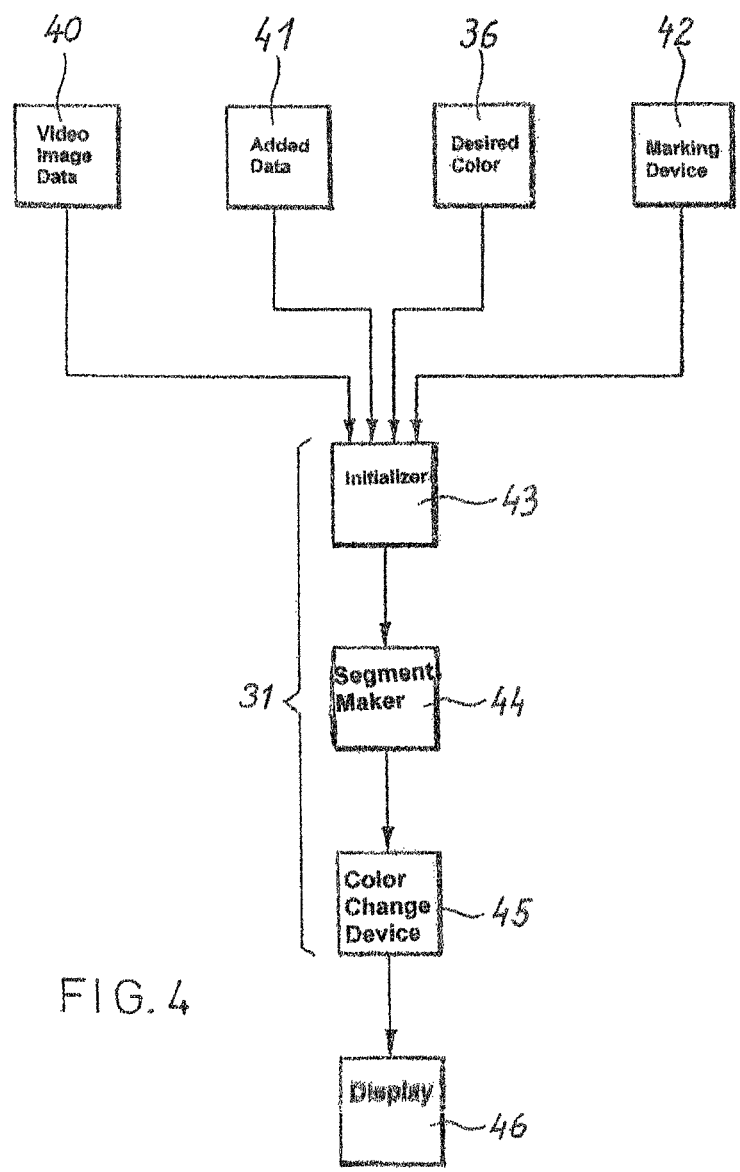
FIG. 4, a flow chart for the method.

In FIG. 4, a schematic flow chart of the method is shown. Along with input of a picture taken 40, which may be a moving video image or initially only an individual picture 21, provision is optionally made for an input of additional information 41 (for instance, the initial hair color of the customer as determined by the hairdresser and/or the proportion of gray, or general customer data), as is an input of a selection of a desired hair color 36 and an input of a marking 42 of at least one picture region 34, the order being arbitrary. These data enter into an initializing device 43, in which the method is started, and into a segmentation device 44, in which relevant picture regions 34 are recognized and distinguished from one another. After the initial hair color 33 has been transformed into the specified desired hair color 36 in a color transformation device 45, a suitable display 46 of an individual picture 21 of a person 11 with the desired hair color 36 is shown on a screen 14, 15 or touch screen 22, 23. The next individual pictures 21 in the video recording are processed accordingly and displayed continuously; a frame reproduction rate of approximately 10 to 30 frames per second is provided, creating a fluid, moving image. However, it can also be provided that a single desired hair color 36 suffices for initialization purposes, if the other parameters and specifications are automatically detected and processed.

Since only a partial aspect of the real image is modified, there are no discrepancies between real and virtual picture elements, such as angular and position inaccuracies, different lighting of the various picture elements, scaling errors, and so forth. Nor is there any problem of coverage, since there is no need to calculate which parts of the virtual picture element are covered by the real picture. Since the real picture is changed only in its color, the hair of a person automatically behaves physically correctly, which creates a natural effect, including of movement by the person, upon reproduction on the screen or touch screen.

LIST OF REFERENCE NUMERALS

1 Hair color consultation system
11 Person
12 Video camera
13 Computer
14 First screen
15 Second screen
16 Input keyboard
17 Mouse
18 Hair
19 Skin
21 Individual picture
22 First touch screen
23 Second touch screen
31 Device
32 Hair region
33 Initial hair color
34 Picture region
35 Skin
36 Desired hair color
37 Hairstyle
38 Background
39 Mirror image
40 Picture taken
41 Additional information
42 Marking
43 Initializing device
44 Segmentation device
45 Color transformation device
46 Picture display
47 Color palette
48 Color-wheel spectrum

The invention claimed is:

1. A method of hair color consultation or hair color simulation, said method comprising the steps of:
    a) inputting a selected desired hair color (36) into a computer (13) by means of the at least one touch screen (22, 23) and/or the at least one screen (14, 15), an input keyboard (16), or a mouse (17);
    b) recording current individual images (21) of a customer (11) in a continuous image sequence in real time by means of a video camera (12);
    c) transmitting the current individual images (21) from the video camera (12) to a computer (13) in a continuous image sequence in real time;
    d) automatically processing each of the individual images (21) in real time by means of a data processor (31) in the computer for display on at least one screen (14, 15) and/or touch screen (22, 23) in real time; and
    e) consulting the display on the at least one screen while deciding on a new hair color;
    wherein
    said processing of the individual images (21) comprises continuously marking hair regions (32) of the individual images (21) changing the hair color (33) of the hair regions (32) according to one or more parameters to produce altered individual images (21) that have changed hair color and are displayed (21) in real time on the at least one screen (14, 15) and/or the at least one touch screen (22, 23)
    said marking hair regions (32) of the individual images (21) comprises an automatic analysis of close and similar pixel color values, of contiguous texture, and/or of contiguous morphological properties; and
    wherein the one or more parameters comprise color shade, texture, brightness, morphology of the hair regions (34), and any change in the one or more parameters as the hair regions move.

2. The method as defined in claim 1, further comprising continuously and automatically processing the one or more parameters of picture regions (34) of the individual images (21) by means of the data processor (31).

3. The method as defined in claim 1, wherein the altered individual images (21) are displayed sequentially for the customer (11) as mirror images (39) on the at least one screen (14).

* * * * *